(12) United States Patent
Zeitler

(10) Patent No.: US 7,631,747 B2
(45) Date of Patent: Dec. 15, 2009

(54) CONVEYOR INDUCT SYSTEM

(75) Inventor: David W Zeitler, Gaines Township, MI (US)

(73) Assignee: Dematic Corp., Grand Rapids, MI (US)

( * ) Notice: Subject to any disclaimer, the term of this patent is extended or adjusted under 35 U.S.C. 154(b) by 1442 days.

(21) Appl. No.: 10/679,613

(22) Filed: Oct. 6, 2003

(65) Prior Publication Data

US 2004/0065526 A1    Apr. 8, 2004

Related U.S. Application Data

(63) Continuation of application No. 09/851,021, filed on May 8, 2001, now Pat. No. 6,629,593.

(60) Provisional application No. 60/203,301, filed on May 11, 2000.

(51) Int. Cl.
B65G 43/00 (2006.01)
(52) U.S. Cl. .................... 198/460.1; 198/460.3
(58) Field of Classification Search ........... 198/460.1, 198/460.3
See application file for complete search history.

(56) References Cited

U.S. PATENT DOCUMENTS

| | | | |
|---|---|---|---|
| 3,485,339 A | 12/1969 | Miller et al. | |
| 3,817,368 A | 6/1974 | Wentz et al. | |
| 3,944,049 A | 3/1976 | Graybill | 198/34 |
| 4,358,472 A | 11/1982 | Small et al. | 427/10 |
| 4,905,512 A | 3/1990 | Hayashi | 73/169 |
| 4,915,000 A | 4/1990 | MacFarlane | |
| 5,038,911 A * | 8/1991 | Doane et al. | 198/357 |
| 5,172,091 A | 12/1992 | Arnold et al. | 340/146.2 |
| 5,267,638 A | 12/1993 | Doane | |
| 5,341,916 A | 8/1994 | Doane et al. | |
| 5,782,332 A | 7/1998 | Guidetti et al. | |
| 5,979,636 A | 11/1999 | Vanacore et al. | |
| 6,629,593 B2 * | 10/2003 | Zeitler | 198/460.1 |
| 6,763,991 B2 * | 7/2004 | Hamano | 227/135 |
| 6,918,484 B2 * | 7/2005 | Affaticati et al. | 198/357 |

(Continued)

FOREIGN PATENT DOCUMENTS

EP    0780327    6/1997

(Continued)

*Primary Examiner*—Douglas A Hess
(74) *Attorney, Agent, or Firm*—Van Dyke, Gardner, Linn & Burkhart, LLP

(57) ABSTRACT

A method and apparatus for controlling gaps between articles traveling on a conveyor system includes providing a plurality of tandem conveying surfaces defining a series of sequentially arranged conveying surface interfaces. At least one of the conveying surfaces associated with each of said conveying surface interfaces is an adjustable-speed conveying surface. At least one article sensor is provided adjacent at least one of the conveying surface interfaces. The article sensor provides information on positions of the articles. The speeds of the tandem conveying surfaces are controlled in a manner that establishes controlled gaps between articles, by identifying a controllable gap that can be adjusted between articles at a particular conveying surface interface and adjusting the controllable gap at the particular conveying surface interface. The control adjusts the controllable gap by adjusting the speed of the adjustable speed conveying surface associated with the particular conveying surface interface using a feedback controller. Gaps between articles are sequentially adjusted at the series of sequentially arranged conveying surface interfaces.

40 Claims, 3 Drawing Sheets

U.S. PATENT DOCUMENTS

| | | | |
|---|---|---|---|
| 7,191,895 B2 * | 3/2007 | Zeitler et al. | 198/460.1 |
| 7,264,109 B2 * | 9/2007 | Raque et al. | 198/460.1 |
| 7,413,071 B2 * | 8/2008 | Zeitler et al. | 198/460.1 |
| 2002/0047633 A1 | 4/2002 | Jurs et al. | 315/291 |

FOREIGN PATENT DOCUMENTS

| | | | |
|---|---|---|---|
| GB | 2 144 698 A | 3/1985 | |
| JP | 05 246528 | 9/1993 | |
| JP | 10 324418 | 12/1998 | |
| WO | WO 99/41169 | 8/1999 | |

* cited by examiner

CONVEYOR INDUCT SYSTEM

CROSS REFERENCE TO RELATED APPLICATIONS

This application is a continuation of U.S. patent application Ser. No. 09/851,021, filed May 8, 2001, and entitled Conveyor Induct System, now U.S. Pat. No. 6,629,593, which claims priority to commonly assigned, U.S. provisional application Ser. No. 60/203,301, filed May 11, 2000, and entitled Induct for Next Generation Sorter.

BACKGROUND OF THE INVENTION

This invention relates generally to conveyor systems, and in particular to the induction section of a conveyor sortation system. The induction section of a conveyor system generally refers to the portion of the conveying system in which articles are inducted, or initiated, into the conveying sortation system. The induction section typically performs the function of providing the proper gaps between packages, or other articles traveling on the conveying system, so that the packages can be sorted for proper distribution. The proper gapping between articles on the conveying system is important for a variety of reasons. First, the gapping of the articles affects the throughput of the conveying system, which is often a factor of high commercial significance. By reducing the gaps between articles on the conveying system, the number of articles that can be placed on the conveying system at a given time is increased. By being able to place more articles on the conveying system at a given time, more articles are moved over a given time period, thus increasing the throughput of the conveying system.

Second, the gapping of the articles is highly important because the gapping affects the sortation functions of the conveying system. Where the conveying system functions to sort the articles being conveyed, prior art conveying systems have often used pusher shoes or other diverting means to push the articles off of a main conveyor onto one or more branch conveyors. In order for these pusher shoes to sort the packages correctly, it is important that sufficient space be provided between articles so that the pushers do not inadvertently push against another article while they are in the process of diverting a second article. Further, pusher shoes on some sorters tend to rotate the article, at least partially, when they are in the process of diverting the article onto a branch conveyor. This rotation ensures that the articles are properly aligned with the branch conveyor when they are diverted. In order for the article to be rotated, however, it is necessary for there to be a space behind the article in order to provide room for the rotation of the article. If insufficient space is allotted, the article may contact another article while being rotated, thus causing it to enter the branch conveyor misaligned, or to not be diverted at all.

The sortation functions of the conveying system therefore weigh in favor of providing a certain amount of gapping between articles while the throughput considerations weigh in favor of reducing this gapping to as small a space as possible. In order to best balance these competing interests, the induct portion of the conveying system would ideally be able to consistently and accurately produce gaps that were just large enough to accommodate the gapping requirements of the sortation section of the conveying system while rarely, if ever, exceeding these minimum gapping requirements. Prior art induct systems, however, have left room for improvement as to the consistency, accuracy, and speed at which at which gapping of the articles can be performed. Particularly as increases in throughput have been based on increasing conveyor speed while reducing gapping, the necessity for precise gapping in conveyor systems has increased.

One reason for the less than desirable performance of prior induct systems has been the inaccuracies that result in controlling an article as it transitions from one conveyor to another. Because gapping between articles can only be changed by changing the speed of one article with respect to another article, the creation and control of gaps tends to occur by utilizing at least two conveyors. For example, if an upstream conveyor is traveling at a first speed and a downstream conveyor is traveling at a different speed than the first conveyor, an article moving from the upstream conveyor to the downstream conveyor will increase the gap between it and any trailing package behind it as it passes onto the downstream conveyor. This increase in gap is due to the acceleration of the article as it initially arrives on the second conveyor. For a certain amount of time, the leading article is traveling at a higher speed (the speed of the downstream conveyor) than the trailing article, which is traveling at the speed of the upstream conveyor. This difference in speeds enlarges the gap between the two articles.

In the past, the controlling of gaps by using multiple conveyors traveling at different speeds has resulted in inaccuracies of the created gap partially because the point at which an article switches from having its speed controlled by the upstream conveyor to the downstream conveyor has not been able to be accurately determined. While this point is often assumed to correspond to the moment when the center of gravity of the article reaches the midpoint between the upstream and the downstream conveyors, this assumption often proves incorrect, thus leading to inaccuracies in the created gaps.

The creation of gaps in prior art conveying systems has also been inaccurate because these prior art conveying systems are not able to accurately determine the position of articles on the conveyors. For example, in some prior art conveying systems, the position of the article was determined by sensing the passing of the article by a single photo-detector positioned alongside the conveyor. As the article moved past the single photo-detector, its position was computed by computing how far the conveyor belt had moved since the article had been detected. Determining how far the conveyor belt had moved often was carried out by way of an encoder that measured the amount of rotations of the motor that powered the conveyor belt. Due to measurement inaccuracies, slippage, and other factors, this calculation of the article's position on the conveyor has a significant uncertainty. This uncertainty of the article's position on the conveyor makes controlling the created gaps in prior art induct systems difficult.

In light of the foregoing disadvantages of the prior art, the need for an induct system that improves the accuracy and consistency of the created gaps between articles can therefore be seen.

SUMMARY OF THE INVENTION

Accordingly, the present invention provides an improved method and apparatus for inducting articles into a conveying system. The method and apparatus allow the position of articles traveling on individual conveyors to be more accurately determined, thus aiding the accuracy and precision of the gapping process. The method and apparatus of the present invention also allow an accurate determination, rather than an assumption, to be made as to the point at which an article moving from one conveyor to another changes from having its speed controlled by the upstream conveyor to that of the downstream conveyor.

According to one aspect of the present invention, a method is provided for determining the control point of an article traveling on a conveyor system. The method includes providing a first and a second conveyor. The first conveyor includes a downstream end that is aligned with an upstream end of the second conveyor. The method further includes detecting when a change occurs in the speed of the article due to the article having reached the second conveyor. According to another aspect of the present invention, a method for controlling a gap between a first and a second article on a conveyor is provided. The method includes providing a first and a second conveyor which are aligned with each other. The speed of the second conveyor is set to be different than the speed of the first conveyor. The control point of the first article is measured as the first article passes from the first conveyor to the second conveyor. Any gap between the first article and the second article is measured while the first article is traveling at least partially on an adjustable speed conveyor. The measured gap is compared to a desired gap, and the speed of the adjustable speed conveyor is adjusted in order to reduce any difference between said measured gap and said desired gap.

According to still another aspect of the present invention, a method is provided for creating a gap between a first article and a second article. The method includes providing a first and a second conveyor which are aligned with each other. The first conveyor is an adjustable speed conveyor. Any gap between the first and the second article is repetitively measured while the first article is at least partially positioned on the first conveyor. Any difference between the measured gap and a desired gap is calculated. A feedback controller is provided which takes the difference between the measured gap and the desired gap and outputs a command for adjusting the speed of the adjustable speed conveyor. The outputted command is based upon the difference between the measured gap and the desired gap.

According to still further aspects of the present invention, apparatuses for carrying out the above-described methods are provided. The measuring of the gap between articles may be accomplished by way of a horizontal array of photo-detectors. The determination of the control point of an article may also be carried out by way of a horizontal array of photo-detectors. The determination of the size of a gap, as well as the issuance of a speed command based upon the size of that gap, may also be repeated multiple times for an individual gap. In this manner, direct feedback is provided to the speed controller for the adjustable speed conveyor as the gap is either maintained or changed. The feedback controller may be a proportional-integral-derivative type controller. In still further aspects of the present invention, the methods and apparatuses for determining the control point of an article can be combined with, or utilized separately from, the methods and apparatuses for creating a gap.

The methods and apparatuses of the present invention provide an improved induction system that allows gaps to be created between packages that are more accurate and consistent, as well as allowing the induction system to operate at higher speeds while maintaining this improved accuracy and consistency. These and other advantages of the present invention will be apparent to one skilled in the art in light of the following specification when read in conjunction with the accompanying drawings.

DETAILED DESCRIPTION OF THE PREFERRED EMBODIMENTS

Figure 1:
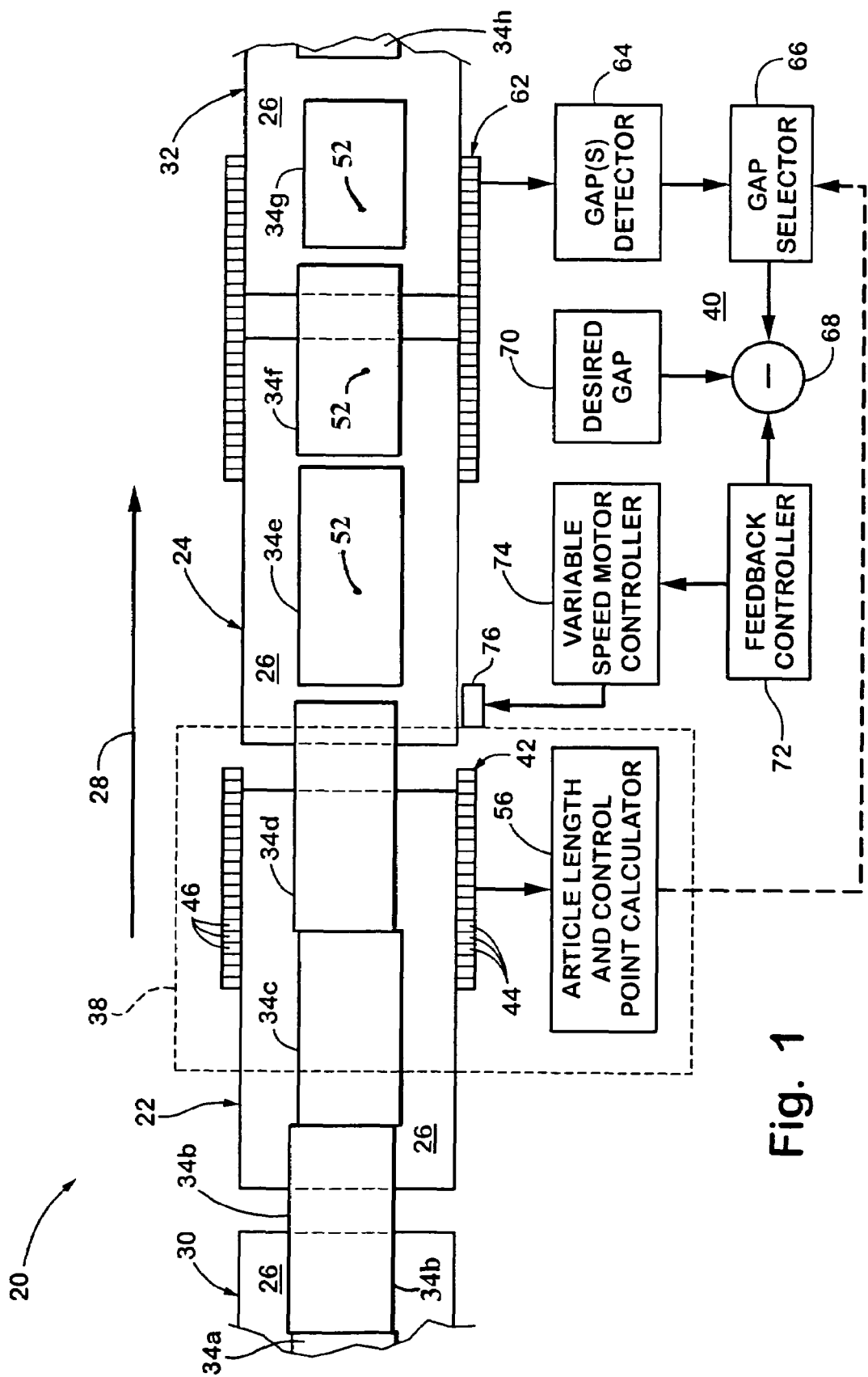
FIG. 1 is a combination plan view and block diagram of a conveyor system and controller according to one aspect of the present invention.

The present invention will now be described with reference to the accompanying drawings wherein like reference numerals correspond to like elements in the several drawings. A conveyor induct system 20 is generally depicted in plan and block diagram form in FIG. 1. Conveyor induct system 20 comprises two subsystems which can be utilized independently from each other or in combination with each other. One such subsystem is a control point determination module 38 which serves to accurately determine the location of the control points on individual articles, as will be explained in more detail below. The other subsystem of conveyor induct system 20 is a gap control system 40 which controls the speed of one or more of the conveyors in order to create a desired gap between articles as they exit onto a take-away conveyor 32. By way of background, such controlling of gaps is also described in commonly-owned U.S. Pat. Nos. 5,267,638 and 5,038,911, the disclosures of which are hereby incorporated herein by reference. The disclosure of commonly-assigned U.S. provisional application Ser. No. 60/203,301, filed May 11, 2000, to which this application claims priority, is also hereby incorporated herein by reference.

Conveyor induct system 20 includes a first conveyor 22 and a second conveyor 24, both of which carry packages or other articles on their conveying surfaces 26 in the direction indicated by arrow 28. The particular type of conveying surface 26 is not limited within the scope of the present invention, but can include belts, rollers, slats, and any other type of conveying structure capable of transporting goods. A feed conveyor, which may include an accumulation conveyor 30, feeds packages to induct system 20. A take-away conveyor 32 carries packages that have been properly gapped to a sortation system (not shown) or other downstream junction. Conveyors 30 and 32 are only partially illustrated in FIG. 1. Take away conveyor 32 is located downstream of, and aligned with, second conveyor 24 and transports articles that are transferred onto it from second conveyor 24. It will be understood that the dimensions of conveyors 22, 24, 30, and 32 are not necessarily drawn according to scale, and that the lengths and widths of these conveyors can vary as would be understood by one skilled in the art. A series of articles 34a-h ride on the conveying surfaces 26 of the various conveyors and move in the direction of arrow 28. Articles 34, which are not part of the invention, are depicted in various sizes and are again not necessarily drawn to scale but are depicted for purposes of description herein.

As can be seen from articles 34a, b, and c, the articles 34 that enter into conveyor induct system 20 from accumulation conveyor 30 may be generally closely packed together such that no gaps exist between these articles. While it is not necessary within the scope of the invention that such lack of gaps exists, it is desirable that excessive gaps be removed or minimized prior to the articles reaching first conveyor 22. Because articles are often manually loaded onto the conveyor system by workers unloading trucks, or other vehicles, there is often a significant amount of spacing that initially exists between articles as they are first unloaded. This spacing may be on the order of several feet and is desirably eliminated or reduced before the articles reach first conveyor 22. To that end, it may be desirable to merge several incoming conveyors into a single conveyor line so that gaps can be reduced or eliminated. While such merging of conveyors may cause a reduction in the average gap between packages, there still may exist individual gaps of varying size. An accumulation conveyor helps remove these gaps, provided articles are being fed into the conveyor system at a fast enough rate. It will be understood, however, that an accumulation conveyor is not a necessary component of the present invention. If an accumulation conveyor is used, it can be any of a variety of types of conventional accumulation conveyors, or other types of accumulation conveyors, as would be known by one skilled in the art.

First conveyor 22 preferably, although not necessarily, operates at a speed that is no greater than the highest speed of the immediately upstream conveyor, which, as illustrated in FIG. 1, is accumulation conveyor 30. By limiting the speed of first conveyor 22 to that of the maximum speed of accumulation conveyor 30, articles that travel from accumulation conveyor 30 onto first conveyor 22 will not have either their leading or trailing gaps increased. The gapping between articles changes when the articles transition from first conveyor 22 to second conveyor 24. First conveyor 22 has a speed which is generally less than that of second conveyor 24 so that any gaps between articles will be enlarged as they pass from first conveyor 22 to second conveyor 24. While not required, first conveyor 22 may have its speed set at a fixed ratio to that of second conveyor 24 so that changes in the speed of second conveyor 24 will cause proportionate changes in the speed of first conveyor 22. Alternatively, it may be desirable to control the speeds of first and second conveyors 22 and 24 so that at certain times they operate at the same speed, while at certain other times they operate at different speeds.

An example of a gap created by the passage of articles from first conveyor 22 to second conveyor 24 can be seen between articles 34e and 34d. This gap will continue to increase until article 34d has passed sufficiently onto second conveyor 24 such that article 34d is carried at the same speed as second conveyor 24. After article 34d has transitioned onto second conveyor 24, the created gap between article 34d and e may or may not be equal to the desired gap. The creation of the desired gap is accomplished during the transition of articles from second conveyor 24 to take-away conveyor 34. An example of a desired gap is illustrated in FIG. 1 between the trailing edge of article 34h and the leading edge of article 34g.

In order to more accurately control the gap between articles as they travel between two conveyors of different speeds, it is helpful to know precisely when the article will shift from moving at the speed of the first conveyor to moving at the speed of the second conveyor. This information can be gained by using control point determination module 38 in order to find the location of the control point of each article. The control point of an article is the point on the article which, when it is aligned with a specified reference point on the conveyor, will designate the moment in time that the article's speed switches from being controlled by one belt to another belt. It is important to know the control point of an article during the gapping phase of the articles because adjustments in the speed of a conveyor during gapping will be ineffective in changing the speed of the article unless the article is still being controlled by the particular conveyor whose speed is being adjusted.

Control point determination module 38 includes a horizontal array of photo-detectors 42 which comprise a first array of photo-emitters 44 and a second set of photo-receptors 46. The emitters 44 are positioned on an opposite side of first conveyor 22 across from, and aligned with, receptors 46. As would be understood by one skilled in the art, the particular side on which emitters 44 and receptors 46 is immaterial so long as the emitters are opposite the receptors. Photo-detector array 42 emits electromagnetic signals, such as light, infrared, or other signals, from emitters 44 across first conveyor 22 to receptors 46, which detect the emitted signal provided there is no article on first conveyor 22 that obstructs the line of sight between an emitter 44 and a receptor 46. Photo-detector array 42 is thus able to determine where gaps between articles are located by determining which particular photo-detectors are not obstructed at a given moment. Horizontal array of photo-detectors 42, which is often referred to as a light curtain, can be any type of conventional array of photo-detectors, such as those that are commercially available from Kore Computing of Comstock Park, Mich., or SICK, Inc. of Bloomington, Minn. Other types of photo-detectors can also be used. Photo-detector array 42 should include photo-detectors that are spaced relatively closely together so that accurate information can be gathered about the location of gaps and the position of articles traveling on first conveyor 22. While other spacings are within the scope of the invention, a photo-detector positioned every five millimeters along the length of horizontal array 42 is contemplated. More compactly spaced photo-detectors would, of course, give more precise information about the location of articles and gaps, if all other factors remain equal.

Photo-detector array 42 should give updated information about the entire array of photo-detectors multiple times a second, such as once every two milliseconds, although this update rate can vary widely within the scope of the present invention, particularly with respect to faster update rates. The height at which photo-detector array 42 is positioned above conveying surface 26 should be very slight so that photo-detector array 42 does not overlook articles traveling on the conveyor that are of very low height. The precise height of array 42 can therefore be varied depending upon the types of articles being sorted. In general, a height above conveying surface 26 of a few millimeters should be appropriate for most situations. It may also be desirable to include multiple arrays of photo-detectors 42 which are vertically stacked upon each other to give height information about articles, as well as information about article shape. The length of photo-detector array 42 is preferably, although not necessarily, at least half as long as the greatest expected article length. Where first conveyor 22 is expected to be used in an application that transports articles of considerable length, the length of array 42 should therefore be correspondingly increased. Photo-detector array lengths that are less than half of the greatest expected article length still fall within the scope of the invention, but do increase the probability of not being able to accurately determine an article's control point, as the following discussion will illustrate.

Figure 2:
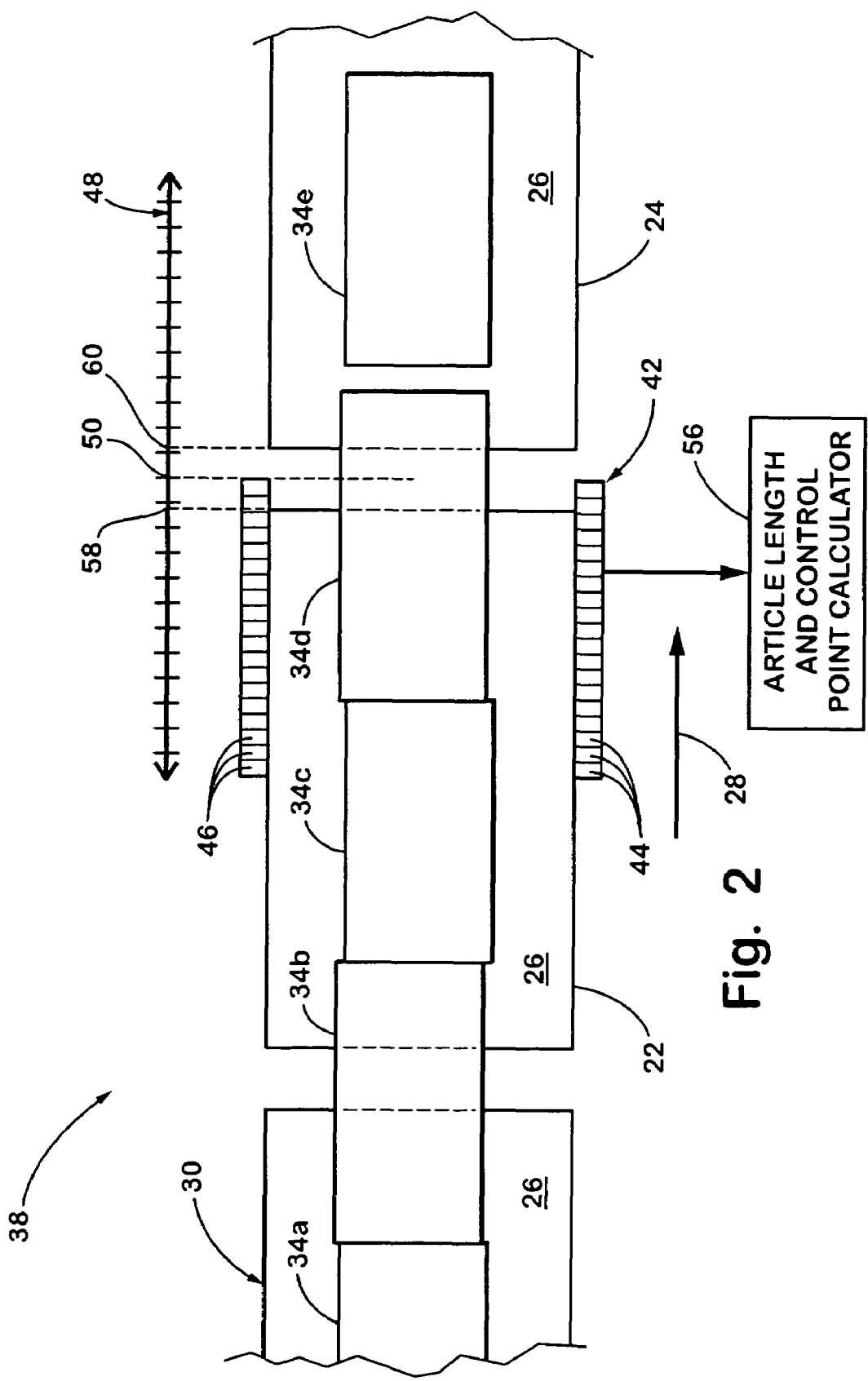
FIG. 2 is a plan view of a conveyor system according to another aspect of the present invention illustrated at a first moment in time.

Control point determination module 38 determines the location of control points on individual articles with respect to a particular reference point. In FIG. 2, a one dimensional frame of reference 48 is illustrated and oriented parallel to first and second conveyors 22 and 24. A reference point 50 is designated on frame of reference 48. Reference point 50 is located halfway between the downstream end of first conveyor 22 and the upstream end of second conveyor 24. A control point 52 is depicted on article 34d. When control point 52 reaches reference point 50, i.e. it becomes aligned with reference point 50, the control of article 34d will switch from first conveyor 22 to second conveyor 24. Thus article 34d, in the position illustrated in FIG. 2, is being controlled by first conveyor 22 despite the fact that a portion of article 34d is located on second conveyor 24. The precise moment when control switches from first conveyor 22 to second conveyor 24 is largely dependent upon the frictional characteristics of the article and the conveyor, as well as the center of gravity of the particular article. While in the past the control point was often assumed to be the center of the article, control point determination module 38 actually measures the location of the control point.

Figure 3:
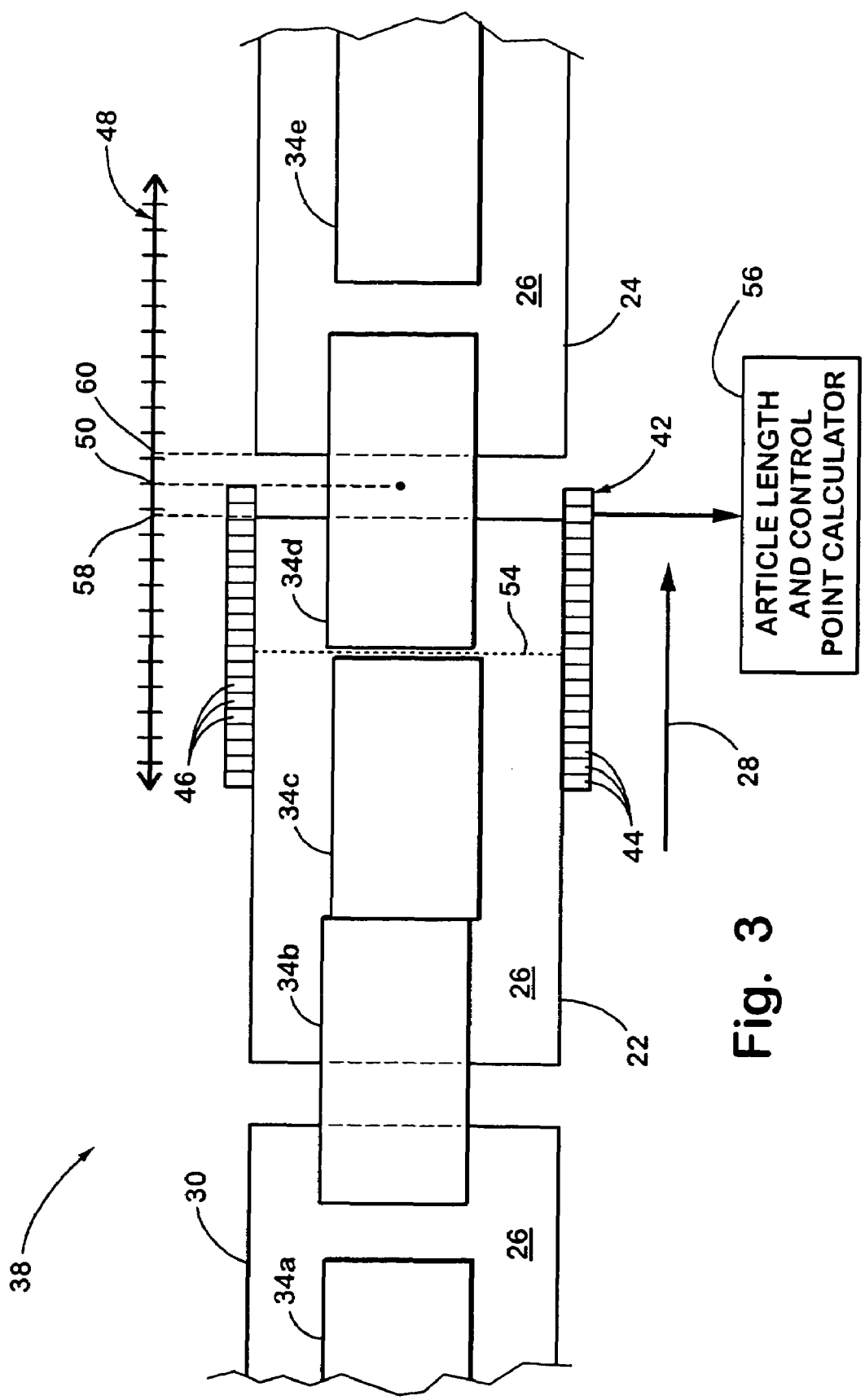
FIG. 3 is a plan view of the conveyor system of FIG. 2 illustrated at a later moment in time.

Control point determination module 38 measures the location of an article's control point by monitoring the gap, if there is one, between the trailing edge of article 34d and the leading edge of article 34c. As long as article 34d is still being controlled by first conveyor 22, this gap will not change. However, as soon as article 34d transitions to being controlled by second conveyor 24, which is traveling at a higher speed than first conveyor 22, article 34d will begin to advance forwardly from article 34c, thus either creating a gap between articles 34c and d, or enlarging whatever gap may have already pre-existed. FIG. 3 depicts the moment when the control point 52 of article 34d has reached reference point 50. At this moment, article 34d begins to separate from article 34c, thus creating a gap between articles 34c and d. This gap is illustrated in FIG. 3 and detected by an unobstructed beam of electromagnetic energy 54 from photo-detector array 42. By monitoring which particular photo-detector in array 42 detects this newly created or expanded gap, the control point of article 34d can be determined by a calculator 56. Because the distance that each individual photo-detector is positioned away from reference point 50 is known, calculator 56 can simply calculate the control point 52 as being this same distance. This calculation of the location of control point 52, however, is based upon the longitudinal distance of control point 52 from the trailing edge of article 34d. Typically, it will be desirable to know the location of control point 52 with respect to a different landmark such as, for example, the leading edge of article 34d. Calculator 56 can easily compute this location of control point 52 by subtracting the longitudinal distance of control point 52 to the trailing edge of article 34d from the overall length of article 34d. Alternative calculation methods are, of course, also possible.

The length of article 34d can be determined in a variety of different manners. One way is to have photo-detector array 42 monitor the leading edge of article 34d while it is within the detection zone of array 42. Once out of this detection zone, the speed of first conveyor 22 is recorded until the change in the gap between articles 34d and 34c occurs. At the moment at which this change in gap occurs, the recorded speed of conveyor 22 can be used to determine the distance article 34d has traveled between the time its leading edge left the photo-detector detection zone and the speed change occurred. This distance will be equal to the distance of control point 52 from the leading edge of article 34d.

The determination of the location of control point 52 is dependent upon what reference point is used to define control point 52. As discussed above, reference point 50 was used to define the location of control point 52. Other reference points could be used. For example, reference point 58 could alternatively be used to define control point 52. Reference point 58 is located at the very edge of the downstream end of first conveyor 22. If reference point 58 is used as the reference point, the control point 52 will be the location on article 34 that is aligned with reference point 58 at the moment the control of article 34 transitions from that of first conveyor 22 to that of second conveyor 24. This control point will correspond to a different physical location on article 34 due to the different locations of reference points 50 and 58. Reference point 60, which is located at the very edge of the upstream end of conveyor 24, could also be used as a reference point. And, as noted, any other reference point can be used in defining the control point so long as the particular reference point is known and used consistently throughout the rest of the conveyor system.

The determination of control point 52 as described herein involves, in one embodiment, the creation or enlargement of gaps between articles as they transition from conveyor 22 to conveyor 24, and the creation or enlargement of these gaps may be desirably controlled. These gaps are created or enlarged as a result of the higher speed of second conveyor 24 with respect to first conveyor 22. If conveyor 22 is set to run at a fixed fraction of the speed of conveyor 24, then the gaps that are created between articles transitioning from conveyor 22 to conveyor 24 will vary as the length of the articles vary. For example, if only long articles are moved over conveyor 22, they will tend to have relatively large gaps. If only small articles are moved, they will tend to have relatively smaller gaps. If both small and large articles are conveyed by conveyors 22 and 24, they will tend to have gaps of varying length. The varying lengths are due to the different amounts of time long and short articles spend moving at the speed of first conveyor 22 while the immediately downstream article is moving at the higher speed of second conveyor 24. This disparity in gap lengths is often desirably reduced or eliminated.

The reduction in the disparity of gap lengths between articles exiting control point determination module 38 may be desirable for several reasons. First, any downstream gap controlling system, such as gap control system 40, may not operate as effectively when articles are being input into the system with widely varying gaps. This may be become more of a problem as conveyor speeds increase. Second, if the gaps created in control point determination module 38 were larger than the desired gaps, they would have to be eliminated downstream by the gap control system. Having to eliminate gaps created by control point determination module 38, of course, makes the gap control system have to work harder, and therefore makes the system less efficient.

In order to carry out this reduction in gap variation, a controller could be added that controls the speed of first conveyor 22 such that, as soon as control point 52 is measured, the speed of first conveyor 22 is immediately brought up to that of second conveyor 24. This will substantially prevent the gaps from getting any larger after the control point is determined, and will tend to reduce the disparity in gaps that would otherwise result for large and small articles if the conveyor speeds remained at a fixed ratio. After the speed of conveyor 22 has been brought up to that of conveyor 24, the existing gaps will not change. The controller would maintain conveyor 22 at the same speed as conveyor 24 up until the moment the control point reached the reference point. At that moment, the controller would decrease the speed of conveyor 22 with respect to conveyor 24 down to an acceptably lower speed such that the control point of the next article could be measured. After this was measured, the speed of conveyor 22 would then be increased to that of conveyor 24 again, and so on. Alternatively, it would be possible to implement this controller by having it make adjustments to the speed of second conveyor 24, rather than first conveyor 22.

After calculator 56 has determined the control point of an article, this information can be fed to whatever other systems, modules, or structures that can make use of this information. In the embodiment depicted in FIG. 1, this information is fed to gap control system 40 where it is used to more accurately control the gapping of articles exiting on take-away conveyor. Alternatively, this information could be used in an induct process such as that described in commonly assigned, U.S. patent application Ser. No. 09/669,170, filed Sep. 25, 2000, and entitled High Rate Induction System, the disclosure of which is hereby incorporated by reference.

Gap control system 40 includes a horizontal array of photo-detectors 62 which may be of the same type of photo-detectors as array 42. Array 62 is located alongside a portion of conveyor 24, a portion of conveyor 32, and the gap between conveyor 24 and conveyor 32. Array 62 preferably, although not necessarily, extends for a distance equal to the maximum expected length of articles that will be conveyed. A gap detector 64 receives the output from array 62 and uses it to determine the gap or gaps between articles that are traveling within the zone of detection of array 62. As illustrated in FIG. 1, gap detector 64 would detect both the gap between articles 34*e* and *f* and the gap between articles 34*f* and *g*. Gap detector 64 detects these gaps by determining which individual photo-detectors are obstructed by articles, and which are not. Based either upon the number of photo-detectors that are not obstructed between articles, or the distance between the most widely separated, non-obstructed set of continuous photo-detectors, the length of a gap can be determined. Also, by determining which individual photo-detectors are not obstructed, the location of the gap with respect to conveyor 24 can be determined based upon the known position of each of the photo-detectors.

After gap detector 64 detects the one or more gaps which are within the detection zone of array 62, it passes this information to a gap selector 66. Gap selector 66 chooses which of the gaps detected by detector 64, if there are more than one, to use in the feedback control loop that controls the speed of conveyor 24. The decision of which gap to use is based upon the location of the control point 52. In the position illustrated in FIG. 1, the control point 52 of article 34*f* has not yet reached the center of the space between conveyors 24 and 32. The speed of article 34*f* is therefore still being controlled by conveyor 24. By adjusting the speed of conveyor 24, it is therefore still possible to adjust the gap between article 34*f* and article 34*g*. Gap selector 66 would therefore choose this gap (between articles 34*f* and *g*) as the gap to be used within the feedback control loop. The dimensions of this gap would then be fed into a comparator which also receives an input from a desired gap 70. The desired gap 70 can be chosen according to the needs of the rest of the conveying system, or can be chosen in any other manner. As illustrated in FIG. 1, the gap between articles 34*g* and 34*h* should correspond to the desired gap. Comparator 68 compares the measured gap from gap selector 66 to the desired gap 70 and outputs the difference between these gaps to a feedback controller 72. Feedback controller 72 outputs a command to a variable speed motor controller 74 that causes controller 74 to change the speed of conveyor 24 as commanded. This command is generated in response to the difference between the measured gap and the desired gap 70. Variable speed motor controller 74 outputs a signal to a motor 76 that powers conveyor 24. The particular type of motor 76 is not limited by the present invention and the location of motor 76 with respect to conveyor 24 can vary from that depicted in FIG. 1.

Feedback controller 72 may be any type of feedback controller, such as a proportional-integral-derivative (PID) controller, or any other type of feedback controller. The particular form of the feedback equation or equations used by feedback controller 72, along with the particular constants or gains used in the equation(s), will vary depending upon the type of controller used, the responsiveness of the controlled motor or motors, the feedback rate, and other factors, as would be understood by one skilled in the art. While other command rates can be used, having feedback controller 72 update and issue commands approximately twenty times per second should generally be sufficient. The commands issued from feedback controller 72 may be either digital or analog. If digital, the operating range of the motor is preferably digitized such that it can be commanded to operate at over one hundred different speeds. Less digitization, however, can also be used within the scope of the invention. The repetitive measuring of the article gaps by array 62 may take place at the same rate as the commands are issued from controller 72, or a different rate.

As article 34*f* moves along conveyor 24, feedback controller 72 will repeatedly issue commands to motor 76 to adjust its speed in order to create the desired gap between articles 34*f* and 34*g*. Feedback controller 72 will continue to output commands to adjust the gap between article 34*f* and article 34*g* until control point 52 reaches the midpoint between conveyors 24 and 32 (assuming the control point to be based on a reference point midway between conveyors). When control point 52 has reached this midpoint, article 34*f* is no longer being controlled by conveyor 24, despite the portion of article 34*f* that is still physically located on conveyor 24. Adjustments to motor 76 in order to change the gap between articles 34*f* and 34*g* are therefore ineffective. Thus, when control points 52 of article 34*f* has reached the midpoint between conveyors 24 and 32, gap selector 66 chooses the gap between articles 34*e* and *f* as the gap whose dimensions are being input into comparator 68. Thereafter, any adjustments in the speed of motor 76 will affect the gap between articles 34*e* and *f*, rather than articles 34*f* and *g*. Any necessary adjustments to the gap between articles 34*e* and *f* will continue to be implemented by gap control system 40 until the control point of article 34*e* reaches the midpoint between conveyors 24 and 32. At that point, the gapping control will switch to the next upstream gap, and so on.

By being able to accurately determine the control point of each article, such as by using control point determination module 38, the control of the gapping performed by gap control system 40 is enhanced. Such control point information allows the gap control system 40 to continue to make any necessary changes in the gap of interest right up until such control is no longer possible. Such control point information also helps ensure that the changes being made to the speed of conveyor 76 will affect only the intended gap and not others. As stated previously, the invention contemplates that such control point information may come from control point determination module 38, or it may come from other sources as well. For example, it would be possible to utilize gap control system 40 wherein the control point information was merely an assumption as to the location of the control point, such as the center point of the article. While such a system would likely be more inaccurate than a system in which the control point was actually measured, gap control system 40 finds equal applicability to such a system.

It will be understood by one skilled in the art that the particular conveyor arrangement indicated in FIG. 1 could vary significantly from that depicted. For example, it would alternatively be possible to implement gap control system 40 in a manner in which the conveyor whose speed was modified to control the gaps was the downstream conveyor, rather than the upstream conveyor. It would also be possible to implement multiple gap control systems 40 sequentially. Such a sequential array of gap control systems might further increase the accuracy of the final gap, particularly where the desired gap differs substantially from the gaps that pre-exist between the articles being fed into gap control system 40. In still another alternative, gap control system 40 could be modified to include one or more additional conveyors upstream of conveyor 24 that used an open loop type of control in order to make refinements to the article gaps such that gapping control system 40 only had to make minor adjustments, if any, to create the desired gaps. In still another alternative embodiment, the horizontal photo-detector arrays could be replaced by other sensors that provided repeated updates about the status of gaps and the position of articles. One such sensor could be a camera or cameras appropriately mounted to visually record the movement of articles. Such video images could be processed by the appropriate software in order to measure the gaps and article lengths in order to provide input into the feedback loop. An acoustic sensor could also be used as an alternative to the photo-detector array, as well as still further types of sensors.

As still another variation, it would possible to adapt feedback controller 72 to limit the acceleration that motor 76 is commanded to undertake. Such limits on acceleration would primarily be designed to avoid tipping any of the articles traveling on conveyor 22. Such limits could be modified based on the determination of control point 52. The more forwardly control point 52 is located on the article to be accelerated, the more acceleration the article can generally withstand without tipping, when all other factors remain equal. If provisions are made to determine the height of the article, this information can also be used to determine the appropriate acceleration that an article can undergo without tipping. The length of the article could also be factored into the determination of the acceptable acceleration for an article, as would be understood by one skilled in the art.

While the present invention has been described in terms of the preferred embodiments depicted in the drawings and discussed in the above specification, along with several alternative embodiments, it will be understood by one skilled in the art that the present invention is not limited to these particular embodiments, but includes any and all such modifications that are within the spirit and the scope of the present invention as defined in the appended claims.

What is claimed is:

1. An induction subsystem for a conveyor sortation system, said induction subsystem comprising:
    a plurality of tandem conveying surfaces defining a series of sequentially arranged conveying surface interfaces, at least one of said conveying surfaces associated with each of said conveying surface interfaces being an adjustable-speed conveying surface;
    at least one article sensor adjacent at least one of said conveying surface interfaces, said at least one article sensor providing information on positions of the articles;
    a control responsive to said at least one article sensor, said control controlling the speeds of said tandem conveying surfaces in a manner that establishes controlled gaps between articles, said control identifies a controllable gap that can be adjusted between articles at a particular conveying surface interface and adjusting the controllable gap at the particular conveying surface interface, said control adjusts the controllable gap by adjusting the speed of the adjustable-speed conveying surface associated with the particular conveying surface interface using a feedback controller;
    said feedback controller adjusts the speed of the adjustable-speed conveying surface associated with the particular conveying surface interface as a function of a position of at least one article control point with respect to the particular conveying surface interface, said feedback controller monitoring the controllable gap while adjusting the speed of the adjustable-speed conveying surface associated with the particular conveying surface interface; and
    wherein gaps between articles are sequentially adjusted at said series of sequentially arranged conveying surface interfaces.

2. The induction subsystem of claim 1 wherein said at least one article sensor comprises at least one chosen from a horizontal photo-detector array and a camera.

3. The induction subsystem of claim 1 including another plurality of tandem conveying surfaces upstream of said plurality of tandem conveying surfaces, said another plurality of tandem conveying surfaces defining at least one other conveying surface interface, said control including an open-loop controller, said open-loop controller adjusting gaps between articles at said at least one other conveying surface interface.

4. The induction system of claim 1 wherein said feedback controller comprises a proportional-integral-derivative controller.

5. The induction system of claim 1 wherein said control assumes control points of articles.

6. The induction system of claim 1 wherein said control measures control points of articles upstream of said plurality of tandem conveying surfaces.

7. The induction system of claim 6 wherein said control selects an acceleration value of said variable speed conveying surface as a function of the control point of an article being accelerated.

8. The induction system of claim 1 wherein said feedback controller outputs multiple commands per second to adjust the speed of said adjustable-speed conveying surface.

9. The induction system of claim 1 wherein each of said conveying surface interfaces includes an upstream conveying surface and a downstream conveying surface, wherein said upstream conveying surface comprises said adjustable-speed conveying surface.

10. The induction system of claim 1 wherein each of said conveying surface interfaces includes an upstream conveying surface and a downstream conveying surface, wherein said downstream conveying surface comprises said adjustable-speed conveying surface.

11. An induction subsystem for a conveyor sortation system, said induction subsystem comprising:
    a plurality of tandem conveying surfaces defining a series of sequentially arranged conveying surface interfaces, at least one of said conveying surfaces associated with each of said conveying surface interfaces being an adjustable-speed conveying surface;
    an article sensor assembly adjacent at least one of said conveying surface interfaces, said article sensor assembly adapted to sensing multiple gaps between articles at a time and repetitively providing information on positions of the articles;
    a control responsive to said article sensor assembly, said control controlling the speeds of said tandem conveying surfaces in a manner that establishes controlled gaps between articles, said control identifies a controllable gap that can be adjusted between articles at a particular conveying surface interface and adjusting the controllable gap at the particular conveying surface interface, said control adjusts the controllable gap by adjusting the speed of the adjustable-speed conveying surface associated with the particular conveying surface interface using a feedback controller;

said feedback controller adjusts the speed of the adjustable-speed conveying surface associated with the particular conveying surface interface as a function of a position of at least one article control point with respect to the particular conveying surface interface, said feedback controller monitoring the controllable gap while adjusting the speed of the adjustable-speed conveying surface associated with the particular conveying surface interface; and wherein gaps between articles are sequentially adjusted at said series of sequentially arranged conveying surface interfaces.

12. The induction subsystem of claim 11 wherein said article sensor assembly comprises at least one chosen from a horizontal photo-detector array and a camera.

13. The induction subsystem of claim 11 including another plurality of tandem conveying surfaces upstream of said plurality of tandem conveying surfaces, said another plurality of tandem conveying surfaces defining at least one other conveying surface interface, said control including an open-loop controller, said open-loop controller adjusting gaps between articles at said at least one other conveying surface interface.

14. The induction system of claim 11 wherein said feedback controller comprises a proportional-integral-derivative controller.

15. The induction system of claim 11 wherein said control assumes control points of articles.

16. The induction system of claim 11 wherein said control measures control points of articles upstream of said plurality of tandem conveying surfaces.

17. The induction system of claim 16 wherein said control selects an acceleration value of said variable speed conveying surface as a function of the control point of an article being accelerated.

18. The induction system of claim 11 wherein said feedback controller outputs multiple commands per second to adjust the speed of said adjustable-speed conveying surface.

19. The induction system of claim 11 wherein each of said conveying surface interfaces includes an upstream conveying surface and a downstream conveying surface, wherein said upstream conveying surface comprises said adjustable-speed conveying surface.

20. The induction system of claim 11 wherein each of said conveying surface interfaces includes an upstream conveying surface and a downstream conveying surface, wherein said downstream conveying surface comprises said adjustable-speed conveying surface.

21. A method of controlling gaps between articles traveling on a conveyor system, said method comprising:

providing a plurality of tandem conveying surfaces defining a series of sequentially arranged conveying surface interfaces, at least one of said conveying surfaces associated with each of said conveying surface interfaces being an adjustable-speed conveying surface;

providing at least one article sensor adjacent at least one of said conveying surface interfaces and sensing articles with said at least one article sensor, including providing information regarding positions of the articles;

controlling the speeds of said tandem conveying surfaces in response to said information regarding positions of the articles in a manner that establishes controlled gaps between articles, including identifying a controllable gap that can be adjusted between articles at a particular conveying surface interface and adjusting the controllable gap at the particular conveying surface interface, said adjusting the controllable gap including adjusting the speed of the adjustable-speed conveying surface associated with the particular conveying surface interface using a feedback controller;

said feedback controller adjusting the speed of the adjustable-speed conveying surface associated with the particular conveying surface interface as a function of a position of at least one article control point with respect to the particular conveying surface interface, said feedback controller monitoring the controllable gap while adjusting the speed of the adjustable-speed conveying surface associated with the particular conveying surface interface; and sequentially adjusting gaps between articles at said series of sequentially arranged conveying surface interfaces.

22. The method of claim 21 wherein said at least one article sensor comprises at least one chosen from a horizontal photo-detector array and a camera.

23. The method of claim 21 including providing another plurality of tandem conveying surfaces upstream of said plurality of tandem conveying surfaces, said another plurality of tandem conveying surfaces defining at least one other conveying surface interface, and further including providing an open-loop controller and adjusting gaps between articles with said open-loop controller at said at least one other conveying surface interface.

24. The method of claim 21 wherein said feedback controller comprises a proportional-integral-derivative controller.

25. The method of claim 21 including assuming control points of articles.

26. The method of claim 21 including measuring control points of articles upstream of said plurality of tandem conveying surfaces.

27. The method of claim 26 wherein said control selects an acceleration value of said variable speed conveying surface as a function of the control point of an article being accelerated.

28. The method of claim 21 wherein said feedback controller outputs multiple commands per second to adjust the speed of said adjustable-speed conveying surface.

29. The method of claim 21 wherein each of said conveying surface interfaces comprises an upstream conveying surface and a downstream conveying surface, wherein said upstream conveying surface comprises said adjustable-speed conveying surface.

30. The method of claim 21 wherein each of said conveying surface interfaces comprises an upstream conveying surface and a downstream conveying surface, wherein said downstream conveying surface comprises said adjustable-speed conveying surface.

31. A method of controlling gaps between articles traveling on a conveyor system, said method comprising:

providing a plurality of tandem conveying surfaces defining a series of sequentially arranged conveying surface interfaces, at least one of said conveying surfaces associated with each of said conveying surface interfaces being an adjustable-speed conveying surface;

providing an article sensor assembly adjacent at least one of said conveying surface interfaces and sensing with said article sensor assembly multiple gaps between articles at a time, including repetitively providing information regarding positions of the articles;

controlling the speeds of said tandem conveying surfaces in response to said information regarding positions of the articles in a manner that establishes controlled gaps between articles, including identifying a controllable gap that can be adjusted between articles at a particular conveying surface interface and adjusting the controllable gap at the particular conveying surface interface, said adjusting the controllable gap including adjusting the speed of the adjustable-speed conveying surface associated with the particular conveying surface interface using a feedback controller;

said feedback controller adjusting the speed of the adjustable-speed conveying surface associated with the particular conveying surface interface as a function of a position of at least one article control point with respect to the particular conveying surface interface, said feedback controller monitoring the controllable gap while adjusting the speed of the adjustable-speed conveying surface associated with the particular conveying surface interface; and sequentially adjusting gaps between articles at said series of sequentially arranged conveying surface interfaces.

32. The method of claim 31 wherein said article sensor assembly comprises at least one chosen from a horizontal photo-detector array and a camera.

33. The method of claim 31 including providing another plurality of tandem conveying surfaces upstream of said plurality of tandem conveying surfaces, said another plurality of tandem conveying surfaces defining at least one other conveying surface interface, and further including providing an open-loop controller and adjusting gaps between articles with said open-loop controller at said at least one other conveying surface interface.

34. The method of claim 31 wherein said feedback controller comprises a proportional-integral-derivative controller.

35. The method of claim 31 including assuming control points of articles.

36. The method of claim 31 including measuring control points of articles upstream of said plurality of tandem conveying surfaces.

37. The method of claim 36 wherein said control selects an acceleration value of said variable speed conveying surface as a function of the control point of an article being accelerated.

38. The method of claim 31 wherein said feedback controller outputs multiple commands per second to adjust the speed of said adjustable-speed conveying surface.

39. The method of claim 31 wherein each of said conveying surface interfaces comprises an upstream conveying surface and a downstream conveying surface, wherein said upstream conveying surface comprises said adjustable-speed conveying surface.

40. The method of claim 31 wherein each of said conveying surface interfaces comprises an upstream conveying surface and a downstream conveying surface, wherein said downstream conveying surface comprises said adjustable-speed conveying surface.

\* \* \* \* \*